US010748192B2

(12) United States Patent
Lee et al.

(10) Patent No.: US 10,748,192 B2
(45) Date of Patent: Aug. 18, 2020

(54) SIGNAL GENERATION FOR ONE COMPUTER SYSTEM BASED ON ONLINE ACTIVITIES OF ENTITIES WITH RESPECT TO ANOTHER COMPUTER SYSTEM

(71) Applicant: Microsoft Technology Licensing, LLC, Redmond, WA (US)

(72) Inventors: Thomas M. Lee, San Francisco, CA (US); Steven H. Kaplan, San Francisco, CA (US); Haowen Cao, Sunnyvale, CA (US); Chencheng Wu, Los Altos, CA (US); John P. Moore, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 16/218,438

(22) Filed: Dec. 12, 2018

(65) Prior Publication Data

US 2020/0193483 A1 Jun. 18, 2020

(51) Int. Cl.
| | | |
|---|---|---|
| G06Q 30/02 | (2012.01) |
| G06F 16/9535 | (2019.01) |
| H04L 29/08 | (2006.01) |
| G06F 9/54 | (2006.01) |
| G06F 16/958 | (2019.01) |
| G06Q 50/00 | (2012.01) |

(52) U.S. Cl.
CPC ......... *G06Q 30/0269* (2013.01); *G06F 9/542* (2013.01); *G06F 16/958* (2019.01); *G06F 16/9535* (2019.01); *G06Q 30/0255* (2013.01); *H04L 67/22* (2013.01); *H04L 67/306* (2013.01); *G06Q 30/0242* (2013.01); *G06Q 50/01* (2013.01)

(58) Field of Classification Search
CPC ...................................... G06Q 30/02
See application file for complete search history.

(56) References Cited

U.S. PATENT DOCUMENTS

| | | | | |
|---|---|---|---|---|
| 2002/0082914 A1* | 6/2002 | Beyda | ................... | G06Q 30/00 705/14.55 |
| 2002/0099605 A1* | 7/2002 | Weitzman | .............. | G06Q 30/02 705/14.35 |
| 2003/0046159 A1* | 3/2003 | Ebrahimi | ............... | G06Q 30/02 705/14.73 |

(Continued)

*Primary Examiner* — Vincent M Cao
(74) *Attorney, Agent, or Firm* — Hickman Palermo Becker Bingham LLP; Daniel D. Ledesma

(57) ABSTRACT

Techniques for managing multiple computing systems are provided. A system comprises a content delivery system (CDS) and an entity identification system (EIS). The CDS causes a content item that is associated with a content delivery campaign to be delivered over a computer network to a computing device of a user. The CDS detects that the user performed an action relative to the content item and, in response, creates an action record that indicates a particular entity associated with the user and that indicates an account that is associated with the content item and causes the action record to be made available to the EIS. The EIS, based on the account indicated in the action record, identifies a particular account from among multiple accounts indicated in an account database and searches the particular account for an entity (if any) that matches the particular entity.

19 Claims, 6 Drawing Sheets

(56) References Cited

U.S. PATENT DOCUMENTS

| | | | |
|---|---|---|---|
| 2008/0300974 A1* | 12/2008 | Bhandari | G06Q 30/02 705/14.46 |
| 2011/0107241 A1* | 5/2011 | Moore | G06F 16/958 715/760 |
| 2012/0310717 A1* | 12/2012 | Kankainen | G06Q 30/02 705/14.4 |
| 2016/0359957 A1* | 12/2016 | Laliberte | H04L 51/32 |

* cited by examiner

FIG. 4

SIGNAL GENERATION FOR ONE COMPUTER SYSTEM BASED ON ONLINE ACTIVITIES OF ENTITIES WITH RESPECT TO ANOTHER COMPUTER SYSTEM

CROSS-REFERENCE TO RELATED APPLICATION

This application is related to U.S. patent application Ser. No. 15/856,247, filed on Dec. 28, 2017, the entire content of which is incorporated herein by this reference for all purposes as if fully disclosed herein.

TECHNICAL FIELD

The present disclosure relates to electronic transmission of digital data over computer networks and, more specifically, to generating signals for one computer system based on online activities of other entities with respect to another computer system.

BACKGROUND

The Internet allows end-users operating computing devices to request content from many different publisher systems. Many third-party organizations desire to send additional content items to users who visit websites of such publisher systems. To do so, many third-party organizations rely on external content delivery computer systems that deliver the additional content items over one or more computer networks to computing devices of such users. Some third-party organizations also use external entity identification computer systems to identify, learn about, and contact specific individuals directly. However, those in a third-party organization who use an external content delivery computer system are often different than those in the third-party organization who use an external entity identification computer system. Also, content delivery computer systems are not integrated with entity identification computer systems. These two realities cause potentially significant inefficiencies in performance of the respective computer systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4 is a screenshot of a user interface that indicates multiple user segments (or groups of entities) that have been created through an entity identification system, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for signal generation for one computer system based on online activities of multiple entities with respect to another computer system are provided. Representatives of an organization employ an entity identification system to identify entities (e.g., other organizations and/or users) that are of interest to the organization. Identities of those entities are made available to a content delivery system that manages content delivery campaigns initiated by multiple organizations, including the organization. The entities become targets of one or more content delivery campaigns initiated by the organization. If the content delivery system detects that a targeted entity interacted with content from one of the content delivery campaigns, then the content delivery system notifies the entity identification system and may prioritize that targeted entity above others.

Embodiments described herein represent technical improvements over prior technological approaches for targeting content to different users. Whereas prior technological techniques resulted in very little overlap (if any) between (a) users targeted using a first computer system and (b) users who have been specifically identified as leads using a second computer system, embodiments solve this problem by automatically identifying entities through the second computer system based on actions performed relative to the first computer system. In this way, all (or nearly all) users interacting with the first computer system may be identified by users of the second computer system. In other words, actions performed by entities as a result of interacting with the first computer system are used as signals in identifying relevant entities for users of the second computer system.

System Overview

Figure 1:
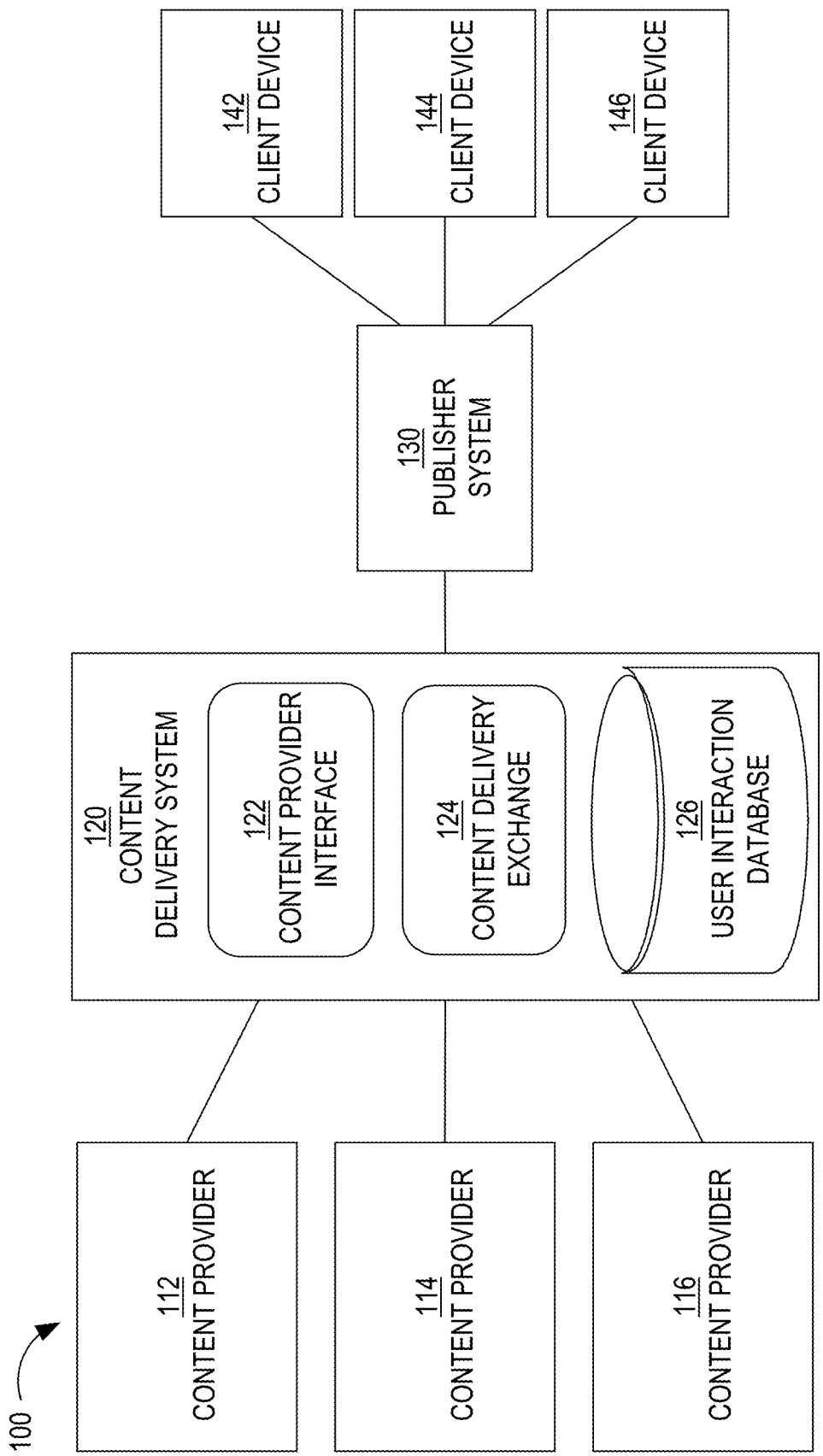
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item summaries, across client devices 152-156 (and other client devices not depicted). For example, content delivery system 120 determines whether a content item summary that content delivery exchange 124 delivers is presented at (e.g., displayed by or played back at) a client device. Such an "event" is referred to as an "impression." As another example, content delivery system 120 determines whether a content item summary that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item summary. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item summary, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item summary, content delivery system 120 may calculate a CTR for the content item summary.

Entity Identification System

Figure 2:
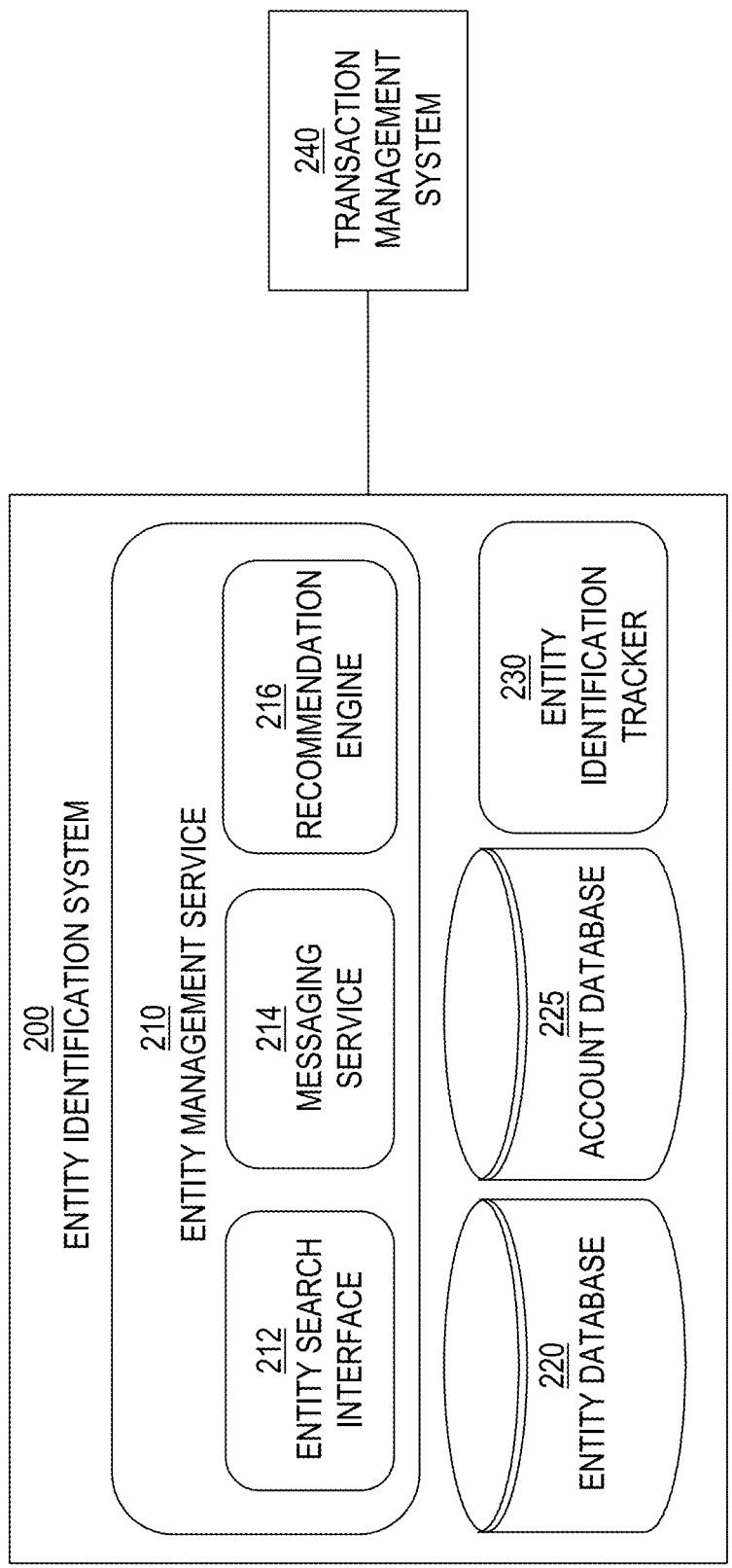
FIG. 2 is a block diagram that depicts an entity identification system, in an embodiment.

FIG. 2 is a block diagram that depicts an entity identification system 200, in an embodiment. Entity identification system 200 includes an entity management service 210 and an entity database 220. Entity management service 210 may be implemented in software, hardware, or any combination of software and hardware. Although entity management service 210 is depicted as including certain features, all embodiments are not limited to requiring these features and some embodiments may include additional features not described herein.

Entity management service 210 may be implemented as a web application, a portion of which operates in entity identification system 200 and another portion of which operates in a web browser executing on a client device. Thus, the web browser transmits a HTTP request over a network (e.g., the Internet) in response to user input (e.g., entering of text and selection of a graphical button) that is received through a user interface provided by the web application and displayed through the web browser. Entity management service 210 receives the input, performs one or more operations, and returns one or more results in an HTTP response that the web browser receives and processes. Instead of a web browser approach, a client-side application is installed and executes on a client device and is configured to communicate with entity management service 210 over a network. An example of entity management service 210 is Sales Navigator™, provided by LinkedIn.

As noted previously, entity management service 210 includes multiple features that a user of the service might leverage. For example, entity management service 210 includes entity search interface 212 that allows users to search for information about entities stored in entity database 220. Example search criteria for searching individuals include name of individual, industry, job title, academic institution attended, academic degree earned, level of schooling (e.g., high school graduate, some college, PhD, etc.), geographic area (e.g., city and state), name of current employer, job function, seniority level, number of years in current job position, number of years at current employer, skills, name of previous employer. Example search criteria for searching organizations include name of organization, industry, geographic area, size of organization (e.g., number of employees), and recent profit or revenue (e.g., Q4 revenue from SEC filings or other public sources).

In an embodiment, entity management service 210 includes an interface that allows a user (or representative of a third-party organization) to select one or more preferences. Such preferences may be selected upon the user's registration (or the third-party organization's registration) with entity identification system 200 and/or some time later after registration and use of entity identification system 200. Entity management service 210 uses the selected preferences to automatically perform searches for the user. Additionally or alternatively, entity management service 210 uses the selected preferences to automatically select corresponding search preferences when searching for leads or accounts. Thus, the user does not have to select the same search preferences each time the user wants to search for relevant leads or accounts.

Entity management service 210 includes a messaging service 214 that includes an interface that allows users to create and send messages to individuals (leads). A message may be an email message that is transmitted to an email account of the individual, a text message that is transmitted over a cellular network to a mobile device (e.g., smartphone) of the individual, or an application message that is transmitted to the individual's account that is maintained by the same party or entity that operates entity identification system 200.

Entity management service 210 includes a recommendation engine 216 that identifies entities with which a user of service 210 might be interested. Recommendation engine 216 may determine potential entities of interest for a user based on one or more factors, such as past searches that the user initiated through entity search interface 212, explicit criteria or interests that the user selected, and identities of past entity identities that the user selected/saved. For example, is a user of entity management service 210 saved an identity for entity A, recommendation engine 216 may determine that entity B is similar in one or more ways to entity A and, as a result of the determination, present information about entity B to the user. As another example, upon registration with entity management service 210, a user selects criteria of entities that the user is interested in, such as job title, organization size, and years of experience. In response, recommendation engine 216 performs a search (e.g., periodically, such as daily) and presents identities of entities to the user. As another example, recommendation engine 216 records a search that a user initiates through entity search interface 212 and causes the search to be performed automatically (i.e., not in response to user input) sometime later, such as the day after the search is performed. Recommendation engine 216 compares the results of the initial search with the results of the subsequent search to determine any differences. If an entity did not appear in the results of the initial search but appears in the results of the subsequent search, then recommendation engine 216 causes an identity of that entity to be presented to the user.

Entity Database

Entity database 220 IS accessible to multiple users of entity identification system 200. Entity database 220 may include information about individuals and organizations, such as companies, charities, non-profit organizations, government agencies, alumni groups, etc. The information may have been submitted by the individuals and by representatives of the organizations directly and/or may have been derived based on other data sources, such as online activity of the individuals and third-party data sources regarding the organizations. For example, a user may register with a social network service and provide personal information (in a digital profile of the user) in exchange for the ability to virtually connect with other users of the social network service and take advantage of features provided by the social network service, such as the ability to view company profiles and other users' profiles. As a similar example, a representative of an organization may register with the social network service and provide information about the organization (in a digital profile of the organization) so that users of the social network service can learn about the organization, can follow the organization, and/or subscribe to messages issued by (and/or about) the organization.

Account Database

Different users of entity identification system 200 have different accounts, reflected in account database 225. (These "accounts" are different than the "accounts" corresponding to entities that are pursued by (e.g., sales) representatives of an organization.) For example, organization A may contract with the provider of entity identification system 200 to have a first account and organization B may contract with the same provider to have a second account. Different accounts may be associated with different privileges that allow authorized users of those accounts to access certain information stored in entity database 220. Similarly, different accounts may have access to different features of entity identification system 200, such as different types of search capabilities (e.g., through entity search interface 212), different messaging capabilities (e.g., through messaging service 214), different types of recommendations (e.g., through recommendation engine), different types of notifications, etc. Different users associated with the same account may be associated with different privileges and/or features. For example, one user of an account may have search, messaging, and administrative capabilities while another user of the account may have only search and messaging capabilities.

The information in entity database 220 may be shared with, or accessible to, content delivery system 120. For example, content delivery exchange 124 may access entity database 220 (or a copy thereof) in order to identify targeted users for one or more content delivery campaigns. Additionally or alternatively, content delivery exchange 124 may rely on one or more prediction models that are based on data stored in entity database 220 when scoring or ranking content items in content item selection events.

Transaction Management System

Entity identification system 200 may include or be affiliated with a transaction management system 240 that stores information about individuals (or contacts), organizations (or accounts), and opportunities (or deals). An "opportunity" is a combination of one or more individuals (or contacts), one or more organizations (or accounts), and one or more products or services that are being sold to the one or more individuals as representatives of the one or more organizations (typically, a single organization per opportunity).

An example of transaction management system 240 is a customer relationship management (CRM) database system. Transaction management system 240 may be remote relative to entity identification system 200, but may be accessible to entity identification system 200 such that entity identification system 200 can store information into transaction management system 240 and/or retrieve data from transaction management system 240 through, for example, one or more application programming interface (API) calls. Transaction management system 240 may be considered the "system of record" for an organization's sales team. Thus, different organization's have their own instance of a transaction management system. Accordingly, entity identification system 200 may be configured to communicate with each such instance. Additionally, because different organizations may use transaction management systems from different providers, entity identification system 200 may be configured to communicate with each type of transaction management system.

"Transaction" may refer to an actual or prospective business transaction involving one or more entities and one or more representatives of each entity. Transaction management system 240 allows representatives of an organization that is selling or marketing one or more products or services to keep track of which individuals and accounts are of interest with respect to selling a particular product or service. For example, a contact record for an individual in transaction management system 240 may include a first name, last name, job title, an employer name, an email address, a date of first contact with the individual, a date of most recent contact with the individual, a notes field indicating what was discussed in the latest electronic or verbal exchange with the individual, a product name or service name in which the individual may be interested, and a sales stage. As another example, an account record for an organization (e.g., a company) may include an organization name, a geographic location, a mailing address, a phone number, a list of principals at the organization, and a list of products/services that are being marketed or sold to this organization.

Entity management service 210 may include a sync feature that allows information about individuals and organizations to be automatically saved to transaction management system 240 in a single user selection. Such a sync feature may be presented as a selectable graphical icon that is adjacent to: a search result corresponding to an entity; a message from an individual; or a recommendation corresponding to an entity.

An individual that has an associated contact record in transaction management system 240 may be associated with (as indicated in the contact record) one of multiple stages with respect to an (sales) opportunity, such as a prospect stage, an opportunity stage, and a customer stage. An individual in a prospect stage is one that is not yet a customer and has less than a certain number of contacts with a sales representative (e.g., two). An individual in an opportunity stage is one that is not yet a customer but that has exhibited interest in a certain product/service and/or has more than a certain number of contacts with a sales representative (e.g., three). If an individual is associated with multiple opportunities (and, thus, multiple products/services) simultaneously, then the individual may be associated with multiple stages simultaneously, but with respect to different opportunities.

If the entity that operates entity identification system 200 contracts with third-party users or organizations who seek access to entity database 220, then entity identification system 200 may be affiliated with multiple transaction management systems, each corresponding to a different organization that sells or markets a product or service. Each third-party user or organization (or simply "account") is associated with a contract that specifies a number of seats for the account. A "seat" may correspond to a unique login for an individual affiliated with account. Thus, ten different representatives of the account may have their own login to entity identification system 200 and be able to access entity database 220 through entity search interface 212. Also, each seat may be associated with its own history of actions that a corresponding representative initiated with respect to entity management service 210 (or, as a more specific example, entity search interface 212). Examples of actions that may be individually tracked include social network actions (e.g., comment, like, share) by the corresponding representative (or seat holder), messages that the corresponding representative sent and/or received along with identities of the recipients/senders of the messages, a number of searches by the seat holder, the search criteria of each search, search results identified based on each search, tags pertaining to seat holders, and any data that the corresponding seat holder supplied, such as notes pertaining to an entity, entities/accounts that the seat holder selected for saving, and sales preferences.

Entity Identification Tracker

Entity identification tracker 230 stores (e.g., in account database 225) data that includes identities of entities with which a user (e.g., a representative of a third-party organization or seat holder) has interacted in some way, whether actively or passively. For example, a user might send, to a particular entity, an electronic message through entity management service 210. If the particular entity responds to the message, then the user selects a graphical icon that causes entity identification tracker 230 to save an identifier of the particular entity for the user. The identifier is stored in a set of saved entity identifiers in association with the appropriate account in account database 225. In a related example, if the particular entity responds to the message, then receipt of the response triggers entity identification tracker 230 to store the identifier in the set of saved entity identifiers. In a related example, the initial message addressed to the particular entity is sufficient to cause entity identification tracker to store the identifier of the particular entity in the set of saved entity identifiers.

As another example, a user initiates (using a computing device) a search through entity search interface 212. In response to the search, entity search interface 212 identifies results that include identities (e.g., names) of multiple entities and those identities are presented on a screen of a computing device operated by the user. The entities may be individuals and/or organizations. The user may select a graphical icon adjacent to one or more of the identities, which causes entity identification tracker 230 to store the corresponding entity identifier(s) in the set of saved entity identifiers (associated with the corresponding account in account database 225). Alternatively, the user may select another graphical icon that causes entity identification tracker 230 to store, in the set of saved entity identifiers, entity identifiers of all entities in the search results. In this way, a user is not required to individually select entity identifiers.

Integration of Entity Identification and Content Delivery Systems

The same third-party organization might have (1) representatives who use content delivery system 120 to create content delivery campaigns and (2) representatives who use entity management service 210 to identify and interact directly with leads, whether prospects, opportunities, or customers. Even though they are from the same third-party organization, each set of representatives is likely to target different groups of people with some overlap. For example, in one case study, only 20% of leads identified using an entity identification system were actually targeted by content delivery campaign(s) managed by a content delivery system. Thus, efforts by the different sets of representatives are not significantly aligned.

In an embodiment, entity identification system 200 is integrated with content delivery system 120 to allow content delivery system 120 to target digital content to entities identified through entity identification system 200 (e.g., via a saved set of entity identifiers). Users of content delivery system 120 (e.g., representatives of content providers 112-116) are prevented from viewing any personal identifying information of the entities identified through entity identification system 200, such as names, entity identifiers, email addresses, etc. Instead, such personal identifying information is not visible to any users of content delivery system 120.

Entity identification system 200 may make entity identifiers accessible to content delivery system 120 in a number of ways. For example, entity identification system 200 stores (e.g., daily) a set of saved entity identifiers in a shared database that content delivery system 120 checks, for example, periodically. As another example, entity identification system 200 transmits a set of saved entity identifiers to an endpoint of content delivery system 120, which is responsible for storing the set of saved entity identifiers.

A third-party organization or content provider has an account with content delivery system 120 and has an account with entity identification system 200. These accounts may have been created at different times by different users or representatives of the third-party organization. After account creation, an administrator of the account with entity identification system 200 provides authorization data and/or authentication that causes both accounts to be linked. Such account linkage is a trigger that causes entity identification system 200 to "share" saved entity identifiers with content delivery system 120. In response to linking accounts, saved entity identifiers identified under the account with entity identification system 200 are made available to the account under content delivery system 120.

In an embodiment, if an entity identified by a saved entity identifier is a particular organization, then entity identification system 200 "expands" the saved entity identifier by causing a search of individual type entities affiliated with (e.g., employed by) the particular organization to be performed and the replacing the saved entity identifier of the particular organization with entity identifiers of the result of the search. The search may involve searching digital profiles of users and determining whether each digital profile indicates that the corresponding user is currently affiliated with the particular organization. Alternatively, instead of entity identification system 200 performing the search to "expand" the saved organization identifier, content delivery system 120 performs the search and performs the replacement. Alternatively still, another component or process that is affiliated with content delivery system 120 and/or entity identification system 200 and that has access to user profiles performs the search to expand the saved organization identifier.

In a related embodiment, instead of identifying all employees or people affiliated with an organization that is identified in a set of saved entity identifiers, only a strict subset of such individuals is identified. The strict subset may be identified using one or more criteria. The one or more criteria may have been specified by a user of content delivery system 120 (e.g., a representative of a content provider) or by a user of entity identification system 200 (e.g., a representative of a third-party organization that is using features provided by entity management service 210). For example, a user of content delivery system 120 specifies a particular job title (e.g., Manager) and a particular job function (e.g., Finance) that an individual must have in order to be targeted by content delivery system 120.

In an embodiment, one or more user segments are created automatically in content delivery system 120 based on the set of saved entity identifiers. For example, one user segment includes saved entity identifiers of users while another user segment includes saved entity identifiers of organizations or of individuals that have been identified as employees of the "saved" organizations.

As another example, one or more user segments are automatically created and are created based on a status of the individual user. Example statuses include prospect (or not associated with any opportunity yet), opportunity (or "open" opportunity), and customer (or "closed-won" opportunities). Such statuses and users may be determined based on data stored in transaction management system 240 (e.g., a CRM). For example, transaction management system 240 stores data about multiple users and organizations, where each user record includes information about a specific user. A user record may include a member identifier (or other identifier (e.g., an email address, a client device identifier, a cookie) that may be used to look up a member identifier) that content delivery system 120 can use to target with content items from one or more content delivery campaigns. Thus, the following segments may be created automatically based on data from entity identification system 200: saved leads and saved accounts (which may originate based on a representative's interaction with entity identification system 200) and prospects, opportunities, and customers (whose data may originate from transaction management system 240 and be read by entity identification system 200).

In an embodiment, a set of saved entity identifiers is filtered based on one or more preferences that a representative may have specified upon registration with entity identification system 200.

In an embodiment, a user segment (e.g., of saved entity identifiers) is required to have a certain number of entity identifiers before content item(s) associated with the corresponding content delivery campaign can be transmitted to the corresponding individuals. For example, if a user segment of saved entity identifiers is less than a threshold number (e.g., three hundred), then the corresponding content delivery campaign remains inactive. However, if the user segment reaches that threshold number, then the corresponding content delivery campaign becomes active.

In an embodiment, a user segment is added to over time with additional saved entity identifiers. For example, on day 1, a first set of saved entity identifiers are identified based on some actions from multiple representatives of a third-party organization. The first set becomes a user segment for a content delivery campaign. On day 2, a second set of saved entity identifiers is identified based on other actions from the same or different representatives of the third-party organization. The second set is added to the user segment. If there are any entity identifiers in the second set that are already in the user segment, then those duplicate entity identifiers might not be added to the user segment.

A content delivery campaign for a user segment may have been created prior to the creation of the user segment or after the creation of the user segment. For example, a marketing representative of a third-party organization interacts with content delivery system 120 to create a content delivery campaign and upload one or more digital items that will be used to create one or more content items (e.g., advertisements) that will be transmitted over one or more computer networks to computing devices of users who are targeted by the content delivery campaign. The content delivery campaign might not have any targeting criteria (e.g., demographic and firmographic criteria) specified that is used to identify users (e.g., by analyzing targeting criteria in relation to the users' digital profiles). Instead, the target audience of the campaign is derived solely from the set of saved entity identifiers determined by entity identification system 200 through actions performed by one or more sales representatives of the third-party organization. The marketing representative may specify additional criteria that is used to filter out saved identifiers of entities who do not satisfy (based on their respective digital profiles) the additional criteria (e.g., geographic location, seniority level, etc.). Additionally or alternatively, the marketing representative may specify targeting criteria that is used to identify targeted users in addition to the users identified in the set of save entity identifiers.

If a content delivery campaign is created after a user segment is created, then a marketing representative may be notified of the user segment when interacting with content provider interface 122, for example, upon login to content delivery system 120. The notification data may notify the marketing representative of the existence of leads and invite the marketing representative to create a content delivery campaign, but without having to specify any targeting criteria. Instead, the leads are automatically set as the target audience of the to-be-created campaign.

In a variation of this example, a sales representative (or administrator) of the third-party organization, interacting with entity identification system 200, is presented with a user interface that allows the sales representative to create a content delivery campaign in content delivery system 120. The content delivery campaign is automatically associated with, in content delivery system 120, an account associated with the third-party organization. (The association may be based on data provided by the sales representative or derived based on login credentials of the sales representative.) Thereafter, any saved entity identifiers determined based on actions of any users of the third-party organization are transmitted to content delivery system 120 and added as a target audience to the content delivery campaign. Also, after the content delivery campaign is created, a user (e.g., a marketing representative of the third-party organization) of content delivery system 120 is presented with data about the newly content delivery campaign, for example, upon login to content delivery system 120. The data may invite the user to establish, through content provider interface 122, certain attributes of the content delivery campaign, such as bid price, total budget, daily budget, ending criteria, and/or one or more content items.

Example Process

Figure 3:
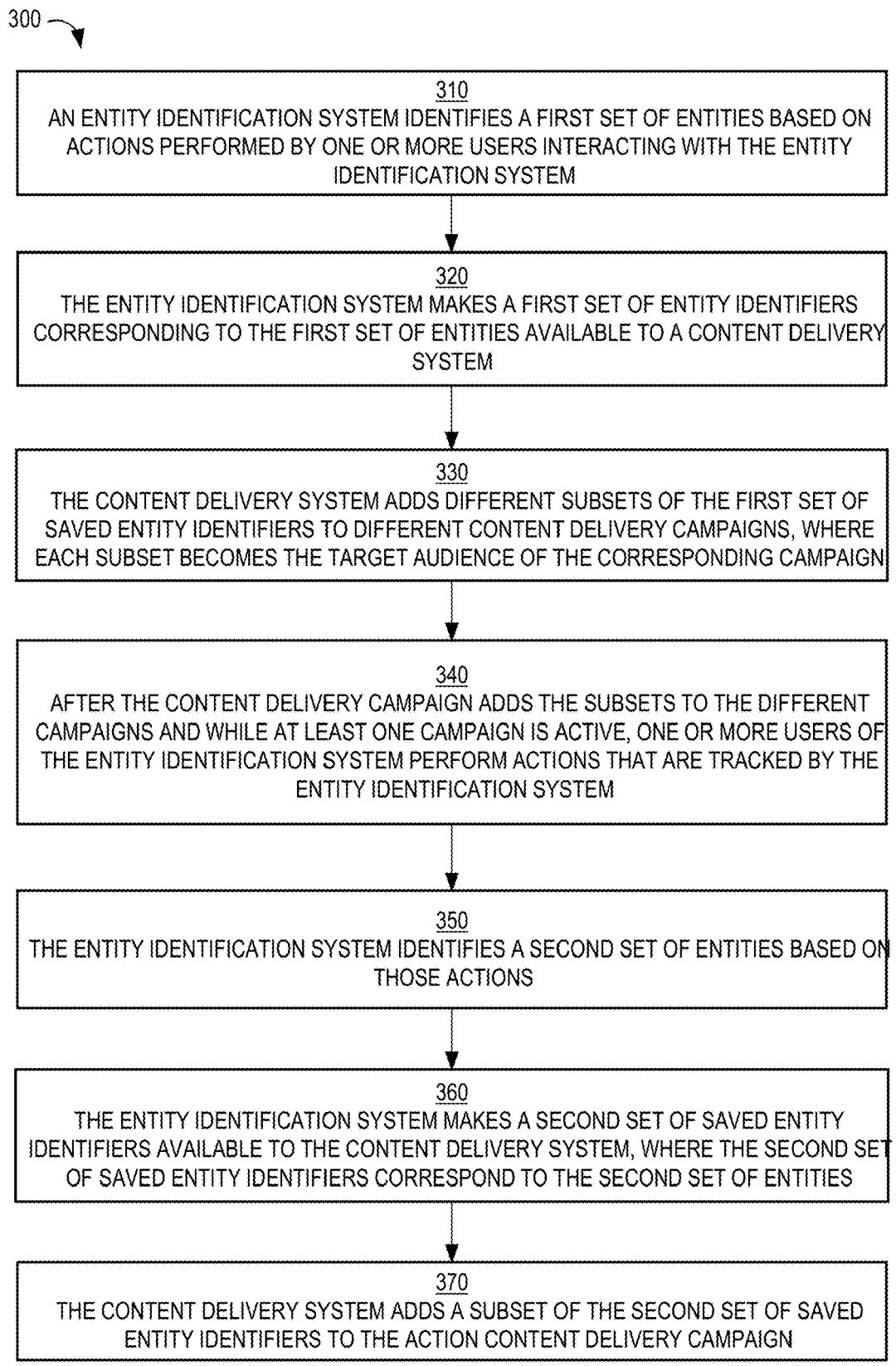
FIG. 3 is a flow diagram that depicts a process for integrating an entity identification system with a content delivery system, in an embodiment.

FIG. 3 is a flow diagram that depicts a process 300 for integrating an entity identification system with a content delivery system, in an embodiment.

At block 310, the entity identification system identifies a first set of entities based on actions performed by one or more users of the entity identification system. Users of the entity identification system interact with the entity identification system through one or more computing devices operated by the users.

At block 320, the entity identification system makes a first set of saved entity identifiers available to the content delivery system. Each entity identifier in the first set of saved entity identifiers corresponds to one of the entities in the first set of entities.

At block 330, the content delivery system adds different subsets of the first set of saved entity identifiers to different content delivery campaigns. Each subset becomes the target audience of the corresponding content delivery campaign.

At block 340, after the content delivery campaign adds the subsets to the different content delivery campaigns and while at least one of the content delivery campaigns is active, one or more users of the entity identification system perform actions that are tracked by the entity identification system.

At block 350, the entity identification system identifies a second set of entities based on those actions.

At block 360, the entity identification system makes a second set of saved entity identifiers available to the content delivery system. Each entity identifier in the second set of saved entity identifiers corresponds to one of the entities in the second set of entities.

At block 370, the content delivery system adds a subset of the second set of saved entity identifiers to the active content delivery campaign.

In this way, the target audience of an active campaign may be updated continuously based on actions performed by users of the entity identification system. A representative of a content provider that initiated the campaign is not required to make any changes to the target audience or targeting criteria in order to add more entity identifiers to the target audience.

Example Content Provider Interface

Figure 4:
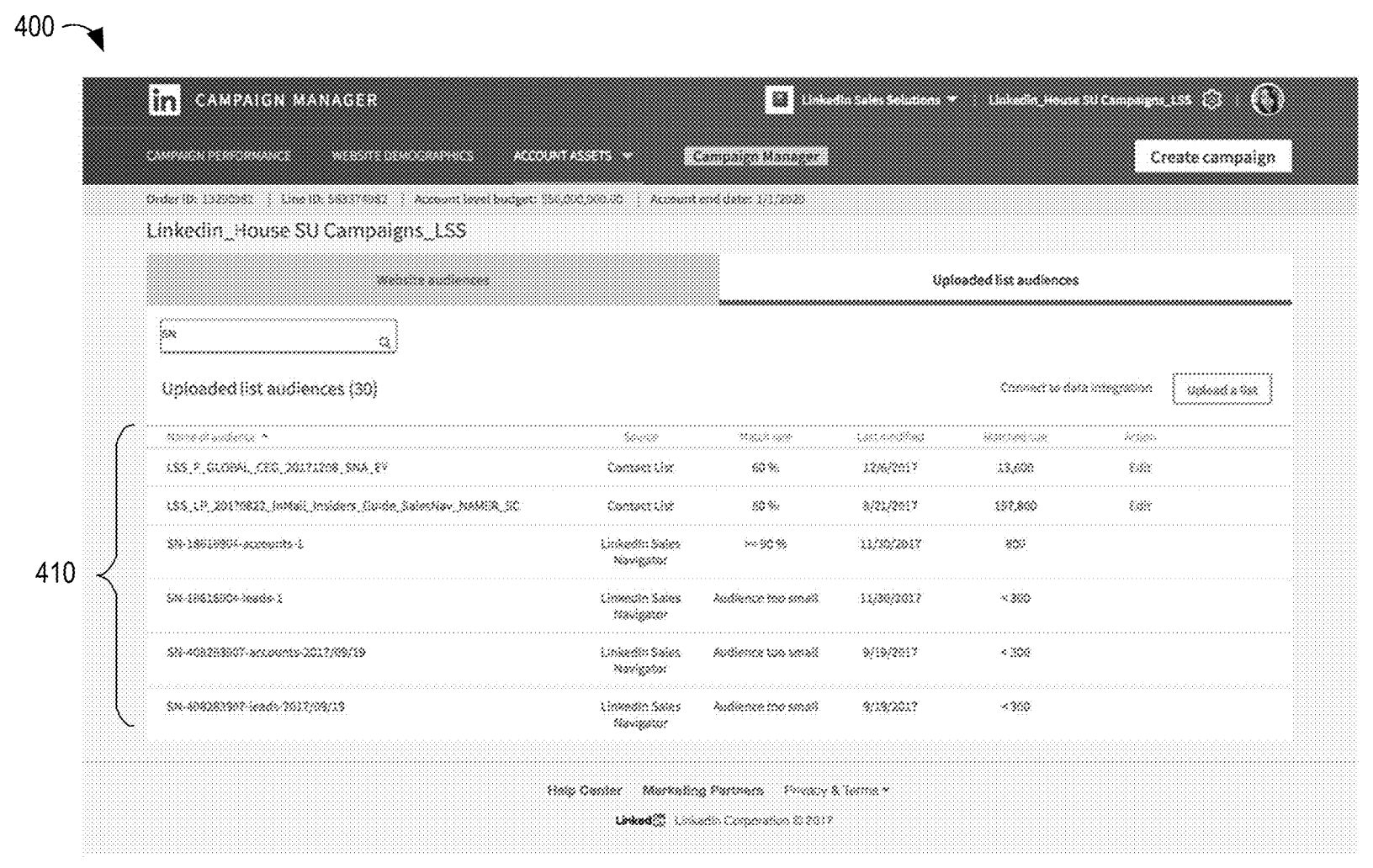

FIG. 4 is a screenshot of a user interface 400 that indicates multiple user segments (or groups of entities) that have been created through entity identification system 200, in an embodiment. User interface 400 includes a table 410 that indicates six different target audiences for six different content delivery campaigns, some of which may not yet be created yet. Table 410 includes columns for audience name, a source of the target audience, a match rate, a last modified date, matched size (or size of target audience), and an action that might be available. Four of the target audiences were created through LinkedIn Sales Navigator, an example of entity identification system 200. Two of the target audiences were created through a contact list that may have been uploaded by a representative of a content provider.

"Match rate" refers to the percentage of the target audience that was found in a user profile database. For example, a contact list might contain an email that is not found in any user profile accessible to content delivery system 120. A "match rate" of "Audience too small" indicates that there are less than a certain number of users in the target audience. In this example, that certain number is three hundred. A content delivery campaign for a target audience that is "too small" cannot begin until the size of the target audience is greater than that certain number.

For the four target audiences that were created through entity identification system 200, there is no action option. However, the contact list of the first two target audiences may be modified to add or remove entries (e.g., email addresses).

Stage Metadata

In an embodiment, in addition to a set of saved entity identifiers, entity identification system 200 makes stage metadata available to content delivery system 120. Stage metadata is associated with each of one or more entity identifiers in the set of saved entity identifiers. For example, for a first entity identifier, the stage metadata indicates a prospect stage, for a second entity identifier, the stage metadata indicates an opportunity stage, and, for a third entity identifier, the stage metadata indicates a customer stage.

In an embodiment, stage metadata associated with an entity identifier determines which of multiple content delivery campaigns the entity identifier is assigned, which causes the corresponding entity to be targeted with one or more content items associated with the assigned campaign. For example, any entity identifiers associated with a first stage are assigned to content delivery campaign A while any entity identifiers associated with a second stage are assigned to content delivery campaign B. Content delivery system 120 reads stage metadata associated with a saved entity identifier and associates the saved entity identifier with the appropriate content delivery campaign.

As another example, entity identification system 200 groups saved entity identifiers based on stage metadata and provides a label for each group (e.g., "Prospect Group" or "Customer Group"). After the groups of saved entity identifiers and labels are made available to content delivery system 120, content provider interface 122 reads the label for each group and displays each label to a representative of the corresponding content provider. Such reading and displaying may be performed when the representative requests (using a computing device) a certain web page or view of content provider interface 122.

Entity identification system 200 determines stage metadata for a saved entity identifier in one or more ways. One approach involves leveraging transaction management system 240, which may keep track of where an individual is in a customer lifecycle. For example, transaction management system 240 may include, for each contact record, an indication of a stage to which the corresponding individual is assigned. Entity identification system 200 uses a saved entity identifier to look up a contact record in transaction management system. If a contact record is associated with a saved entity identifier, then the contact record may include the saved entity record or may include another value that is mapped to the saved entity identifier. If no stage is indicated in an identified contact record, then stage metadata may be a null value or a default value, such as value indicating a prospect stage. Thus, if no stage information is available for an individual, then it is presumed that the individual is neither a customer nor an opportunity.

An individual's stage assignment may be derived based on information in the individual's contact record as opposed to being explicitly indicated. For example, one or more fields of the contact record (e.g., a notes field or a message response checkbox indicating whether the individual responded to an electronic message or a voice message from a sales representative) may be analyzed to determine to which stage the individual should be assigned.

If information about an entity is not found in transaction management system 240, then a user of entity management service 210 may provide data that causes entity management service 210 to create a contact record in transaction management system 240. The contact record may be automatically populated with data from a corresponding entity record in entity database 220.

As another example of how stage metadata may be determined, entity identification system 200 determines stage metadata for a saved entity identifier by reading, from entity database 220, an entity record that is associated with (or includes) the save entity identifier. An entity record may include a stage indicator if, for example, a user of entity management service 210 (e.g., a sales representative of a third-party organization) provided input that caused the entity record to include the stage indicator, such as after viewing information about the corresponding entity in a set of search results or after viewing the corresponding entity's profile through entity search interface 212. In this embodiment, entity database 220 (or at least a portion thereof) stores data that is specific to a particular third-party user or organization. Different representatives of different third-party organizations may be able to view the same information about a particular entity, but cause different data to be stored about that particular entity, such as an email address or notes from a phone call with that particular entity. Thus, a third-party organization's annotations to entity database 220 remain private or accessible only to that third-party organization. Other third-party organizations are not allowed to see those annotations.

In some situations, the size of individual user segments for different stages may be less than a threshold number (e.g., three hundred) that is required to begin or activate a corresponding content delivery campaign. However, the sum of two or more segments of different stages may be greater than the threshold number. In an embodiment, a user (e.g., a marketing representative of a third-party organization) interfacing with content delivery system 120 through content provider interface 122 is presented with combination data that invites the user to combine multiple user segments created by sets of saved entity identifiers identified by entity management service 210. The combination data may indicate a size of each user segment (e.g., 56, 81) and/or may indicate that user segment A plus user segment B is sufficient to begin a content delivery campaign. For example, combining a customer segment, an opportunity segment, and a prospect segment may be necessary to initiate a content delivery campaign regarding (a) brand awareness (which would normally be for just the prospect segment), (b) education (which would normally be for just the opportunity segment), or (c) providing a review/feedback of a product (which would normally be for just the customer segment).

In an embodiment, if a saved entity identifier of an individual is determined based on expanding a saved account/organization identifier, then that saved entity identifier is automatically associated with default stage metadata that indicates, for example, a prospect stage. For example, an organization identified by a saved account identifier is associated with two hundred individuals, two hundred entity identifiers are identified, and a prospect indicator is associated with each of the two hundred entity identifiers. However, an "expanded-to" entity identifier may identify an individual that is already associated with (e.g., as indicated in transaction management system 240) a particular stage (e.g., an opportunity stage or a customer stage). Thus, from expanding a saved account/organization identifier to multiple saved user identifiers, those saved user identifiers may correspond to individuals that are associated with different stages and may be used to create one or more user segments, such as one user segment for one stage and another user segment for another stage.

In some scenarios, one instance of a saved entity identifier is associated with a first stage (e.g., a prospect stage) and another instance of the saved entity identifier is associated with a second stage (e.g., an opportunity stage). Thus, a particular individual/lead may be associated with multiple stages. This may occur if a sales representative has saved an account (and the entity identifier for that account has been expanded) and then, later, also saved a particular lead to that account. In an embodiment, if such a scenario is detected (whether by entity identification system 200 or content delivery system 120) where there are two instances of a particular entity identifier associated with different stages, then one of the instances is removed. For example, the instance of the saved entity identifier associated with the "lower" stage (e.g., prospect v. opportunity or opportunity v. customer) is removed from the corresponding user segment.

Product Metadata

Some third-party organizations manufacture, produce, or sell multiple products and/or services (hereinafter "products"). Different representatives of a third-party organization may be responsible for selling different products and, thus, will likely identify different groups individuals/leads using entity management service 210. If entity identifiers of all leads were made available to content delivery system 120 and targeted with the same content item(s), then some individuals will be presented with the wrong marketing content. For example, if a third-party organization sells products A and B, a content delivery campaign was created for product A, and all saved entity identifiers were associated with the content delivery campaign, then all the individuals would be targeted with marketing content pertaining to product A even though some of the individuals may have been identified as potential customers of product B.

In an embodiment, one or more saved entity identifiers are associated with product metadata. The product metadata is used to determine to which user segment, of multiple user segments, a saved entity identifier will be assigned. For example, entity identification system 200 makes available (e.g., transmits), to content delivery system 120, a set of saved entity identifiers and product metadata that associates, for each saved entity identifier, a particular product/service. Content delivery system 120 uses the product metadata to automatically assign a saved entity identifier to a user segment (of an existing or to-be-created content delivery campaign) that is associated with the product/service assigned to that saved entity identifier.

Product metadata for a saved entity identifier and for a content delivery campaign may comprise a unique product identifier (e.g., an alphanumeric value or a numeric-only value).

Determining a product metadata for a saved entity identifier may be performed in one or multiple ways. For example, each seat holder or sales representative is associated with product metadata that indicates which product(s) the seat holder or sales representative is selling. Such product metadata may be established by a sales representative or an administrator for the corresponding third-party organization when creating or establishing an account with entity identification system 200. For example, an account with entity identification system 200 may include ten seats, three of which are associated with product A, two of which are associated with product B, and five of which are associated with product C.

As another example of using seat holder data, each saved entity identifier is associated with a seat under which the corresponding entity was identified and selected by the corresponding seat holder/representative. Thus, each entity identifier in a set of saved entity identifiers may be associated with a seat identifier. Previously, a mapping was created (e.g., via input by an administrator interacting with entity identification system 200) by associating different seats with different products. Later, the mapping is used to identify, for each seat identifier, a corresponding product name/identifier.

In an embodiment, an individual/lead may be identified by different seat holders associated with different product metadata. Thus, a saved entity identifier may be associated with multiple product metadata. If so, there may be two instances of the saved entity identifier, each with different product metadata. Thus, the same saved entity identifier may be appear two or more different user segments that are eventually targeted by content delivery system 120. Alternatively, a single instance of the saved entity identifier is accompanied by a list of zero or more product metadata.

Another way in which product metadata for a saved entity identifier may be determined is through transaction management system 240, which may store a product name or identifier in a contact record of an individual. When an individual/lead is identified by entity management service 210 and selected by a user of that service (which causes an entity identifier of that individual/lead to be saved), entity management service 210 checks with transaction management system 240 to determine whether a contact record in transaction management system 240 exists. Such a determination may compare (a) a name and/or other information about the entity from entity database 220 with (b) names and/or other information in contact records of transaction management system 240. If there is a match or partial match, then the transaction management system 240 is updated to include the entity identifier and/or entity database 220 is updated to include a contact identifier that uniquely identifies the contact record. If there is no match, then a user of entity management service 210 is presented with an option (e.g., via entity search interface 212) to provide input to create a contact record in transaction management system 240. In response to such input, entity management service 210 makes one or more calls to transaction management system 240 to create that contact record and associate that contact record with the entity identifier.

Another way in which product metadata for a saved entity identifier may be determined is through a web beacon. A web beacon is any of a number of techniques used to track a client device or entity that requested a web page or read an email (that contains the web beacon) and when. Alternative names for web beacon include tag, page tag, tracking pixel, and pixel tag. When implemented using JavaScript, a web beacon may be called a JavaScript tag.

For example, a third-party organization includes a web beacon (that points to entity identification system 200 or a related endpoint) on a web page that the third-party organization hosts. If a client device of an individual requests the web page, then the web beacon is "fired" or executed by the client device (or a web browser executing on the client device) and a call is made to entity identification system 200. The call includes a product identifier and a device or other identifier associated with the client device, browser, or individual. The device or other identifier is used to identify an entity record in entity database 220 or a contact record in transaction management system 240 and the product identifier is associated with the corresponding entity or contact record.

If entity identification system 200 allows for a saved entity identifier to be associated with both stage metadata and product metadata, then it may be possible for different instances of a saved entity identifier to be associated with different combinations of stage metadata and product metadata. The above removal technique (involving removing one or more instances of a saved entity identifier from a user segment) may be implemented for instances of a saved entity identifier that belong to (or are associated with) the same product. However, different instances of a saved entity identifier may be associated with the same or different stage if the different instances are also associated with different products. In such a case, neither instance is removed and the same individual/lead may be targeted with content pertaining to the different products. For example, one instance of a saved entity identifier is associated with the prospect stage with respect to product A and another instance of the saved entity identifier is associated with customer stage (or the prospect stage) with respect to product B.

Tracking Public Actions

In an embodiment, content delivery system 120 tracks one or more public actions performed by entities with respect to content presented by publisher system 130. Examples of content presented by publisher system 130 include company/organization web pages hosted by publisher system 130 (or a third-party publisher system relative to content delivery system 120), product/service web pages hosted by publisher system 130 (or a third-party publisher system relative to content delivery system 120), and content items that are part of one or more content delivery campaigns managed by content delivery system 120. Public actions may include likes, comments, and shares. A "like" of a piece of content is a signal from the user that selected a "like" icon that the user is interested in the subject matter of the content. Providing a "comment" with respect to a piece of content causes the comment to be displayed to other users that view the same content. A user "sharing" a piece of content causes the content to be presented to one or more other users, such as users in the user's social network or sphere of influence. relative to content delivery system 120), and content items that are part of one or more content delivery campaigns managed by content delivery system 120. A possible result of "liking," commenting on, and "sharing" a piece of content is content delivery system 120 or publisher system 130 identifying content that is related to the liked/commented/shared content and providing that related content to the user, whether in the form of recommendations, advertisements, or potentially relevant content in a content item feed tailored to the interests of the user.

Another example of a public action is a user filling out a form with personal information (such as one or more names and/or contact information of the user, such an email address, phone number, mailing address, etc.) or providing input that indicates that a content provider that is hosting the form may access at least a portion of the user's personal information, such as from a user profile that is maintained by a social network service. The form may be part of a content item that is part of a content delivery campaign.

Another example of a public action is providing input (e.g., a comment) relative a product/service review page that is hosted by publisher system 130 or a computer system that is a third party relative to content delivery system 120.

A public action may be reflected in an action record that indicates multiple pieces of information, such as a type of action (e.g., like, comment, share, form filling, review), one or more entity identifiers associated with the user that performed the action (e.g., a member identifier (e.g., a social network member identifier), a device identifier, a cookie, a MAC address, an IP address), an account identifier (e.g., that identifies a content provider that provided the content with which the user interacted), a timestamp that indicates a date and/or time in which the user performed the action, a domain identifier (that identifies a web domain in which the action occurred), a content identifier (that identifies the content with which the user interacted), and a product identifier (that identifies a product/service that is the subject of the content with which the user interacted).

Content delivery system 120 stores action records and makes the action records available to entity identification system 200. For example, content delivery system 120 sends the action records to an (e.g., web) endpoint associated with entity identification system 200. As another example, content delivery system 120 stores the action records in a storage location that is accessible to entity identification system 200. Content delivery system 120 may notify entity identification system 200 directly with one or more electronic messages or entity identification system 200 may regularly check the storage location for any new action records. Entity identification system 200 may update the storage location with data that indicates which action records have already been read by entity identification system 200 so that entity identification system 200 does not read the same action record twice.

In a related embodiment, one or more third-party platforms (that host content with which users interact) create action records and make the action records available to entity identification system 200. For example, a third-party platform hosts a webpage that includes a form for users to fill out if they are interested in learning more about a product or service. The form requests contact information from the user. The third-party platform creates an action record for each instance of the form that is filled out and makes the action record available to entity identification system 200.

Non-Public Actions

A targeted user may interact with a piece of content (e.g., a content item of a content delivery campaign) by performing a non-public action, such as viewing a portion of a video, listening to audio, or clicking on the content, which causes the user's device to request data from a landing page that is hosted by the content provider of the content. Instead of informing entity identification system 200 of that user based on such a non-public action, organization-level data may be updated instead. For example, a non-public action may cause an action record to be created that indicates one or more attributes of the corresponding action, similar to the attributes described above, such as whether the action is public or non-public, an action type (e.g., click, watched video, visited a particular page), a timestamp, a domain identifier, a content identifier, a product identifier, an account identifier (e.g., that identifies a content provider that provided the content with which the user interacted), and an organization identifier that identifies an organization with which the user that performed the action is associated (e.g., employed). The organization identifier may be determined by looking up a profile of the user in a user profile database based on a user identifier and retrieving an organization identifier from the profile or identifying a name of an organization (e.g., a current employer) of the user and using a mapping that maps organization names to organization identifiers. The subsequent action record might not include any user-related identifier. In this way, the identity of the user performing the non-public action is not disclosed to any user.

In an embodiment, action records generated as a result of non-public actions are grouped by account and aggregated at the organization level. Thus, only users (of entity identification system 200) associated with a particular account will see aggregated action records pertaining to the particular account. Either content delivery system 120 or entity identification system 200 may perform the grouping and aggregation.

Users not Associated with User Segments from Entity Identification System

Many users that interact with content presented through publisher system 130 and/or one or more other computer systems may be different than users that are originally identified by entity identification system 200. In other words, one or more entity identifiers that are associated with users that perform actions relative to content presented through publisher system 130 and that are made accessible to entity identification system 200 were not originally identified through entity identification system 200. Embodiments described herein involve entity identification system 200 (1) identifying entity identifiers based on activity of users of entity identification system 200 and (2) sending the entity identifiers to content delivery system 120 to be part of one or more current or to-be-created content delivery campaigns. Other embodiments may not involve such integration between entity identification system 200 and content delivery system 120. Instead, in an embodiment, there is only integration one-way: from content delivery system 120 to entity identification system 200. In this embodiment, content delivery system 120 transmits action records to entity identification system 200. An organization's account with content delivery system 120 may have been linked to the organization's account with entity identification system 200 prior to or subsequent to the creation of the action records.

Some of the action records may pertain to users that are not indicated in entity database 220 or transaction management system 240. However, some of the action records from content delivery system 120 may pertain to users that are so indicated. Thus, a content delivery campaign established by an organization/content provider may have serendipitously targeted a user that is associated with an account (of the organization) in entity identification system 200. For example, an action record may identify a user that is indicated in transaction management system 240 (but not indicated through activities of a user of entity identification system 200).

Account Matching

In order to determine that a user/organization indicated in an action record matches a user/organization being tracked by an organization user of entity identification system 200, two accounts are first matched. One of the two accounts is an account that a content provider (that initiates a content delivery campaign with content delivery system 120) has with content delivery system 120. The other account is an account that the content provider (or the corresponding organization) has with entity identification system 200. At some point, the two accounts are linked. Two accounts are "linked" if the two accounts have the same account identifier or if there is a mapping between the two accounts, whether through a single identifier or multiple identifiers. For example, entity identification system 200 stores a mapping that maps account identifiers created/maintained by content delivery system 120 to account identifiers created/maintained by entity identification system 200.

In an embodiment, given an action record, entity identification system 200 identifies (e.g., based on an account identifier indicated in the action record) a corresponding account indicated in account database 225. Once a corresponding account is identified, then the account may be checked to determine whether a user/organization indicated the action record matches a user/organization that is being tracked by users (e.g., sales representatives) of the organization of the account.

Entity Matching

Once the accounts are matched, an entity associated with the action record is searched for with respect to entity identification system 200. The search may be performed by entity management service 210 and involve the corresponding account in account database 225 or in the corresponding transaction management system. The search may be performed in a number of ways. For example, an action record may include a member (or other) identifier (e.g., an IP address, a MAC address, a cookie identifier) and the same identifier is included in a record in the corresponding account of account database 225 or in the corresponding transaction management system.

As another example, entity identification system 200 uses a mapping to map an identifier in an action record (e.g., a member identifier or a device identifier) to one or more other identifiers (e.g., email address, MAC address, IP address, cookie identifier) that are then compared to user-indicating identifiers in different records in the corresponding account of account database 225 and/or the corresponding transaction management system. Thus, one or more "translations" of an identifier may be made before comparison is performed.

Entity Match

An "entity match" is when an action record matches an entity record indicated in the corresponding account of account database 225 or in the corresponding transaction management system. Entity identification system 200 (or, specifically, entity management service 210) performs one or more actions in response to identifying an entity match. Example actions including generating one or more types of notifications and ranking entities.

For example, entity management service 210 generates, based on an entity match, one or more notifications for users (e.g., sales representatives) of entity identification system 200. A notification may be in the form of a message that includes information about the entity (user or organization) indicated in the action record. Example messages include an email message, a text message, or a pop-up message that is presented when a user logs into entity identification system 200 or provides some other input to entity identification system 200. Instead of a message, a notification may be in the form of an icon that is displayed and that, when selected, causes information about the entity to be presented. Examples of user information include a name of the user, an action that the user performed, an identification and/or a description of the content with which the user interacted, an organization (e.g., employer) associated with the user, a job title of the user, an industry, a job function, one or more skills of the user, endorsements of the user, academic degree(s) that the user earned, academic institution(s) that the user attended. Examples of organization information include a name of the organization, an action that the user associated with the organization performed, an identification and/or a description of the content with which the user interacted, one or more geographic location(s) of the organization, one or more principals (e.g., owners or officers) of the organization, and an industry of the organization. Entity management service 210 may read some of such user/organization information from entity database 220 and some from the corresponding action record.

A notification may be reflected in a list of recommendations that is presented to a user of entity identification system 200. A recommendation may include information (e.g., an icon or other indicator) that indicates whether the corresponding user/organization interacted with content, such as content delivered by content delivery system 120. User selection of a recommendation that is based on an entity match may cause the user/organization information (described above) to be displayed.

In an embodiment, different types of actions from action records trigger different types of notifications. For example, a "like" by a targeted user may cause an icon to be displayed the next time an account representative (of the appropriate account) logs onto entity identification system 200, a "share" by a targeted user may cause an email message to be sent to the account representative, and a form filling by a targeted user may cause a text message to be sent to the account representative.

Another example action that entity identification system 200 may perform in response to identifying an entity match includes ranking. For example, an organization representative requests a view of saved entities and entity management service 210 ranks the saved entities based on the entity match, such that the corresponding entity in the saved entities is ranked higher than it otherwise would have been without the entity match.

As another example, a non-public action may cause the corresponding organization to be ranked higher in an organization search than other organizations identified as a result of search for organizations.

Example Process

Figure 5:
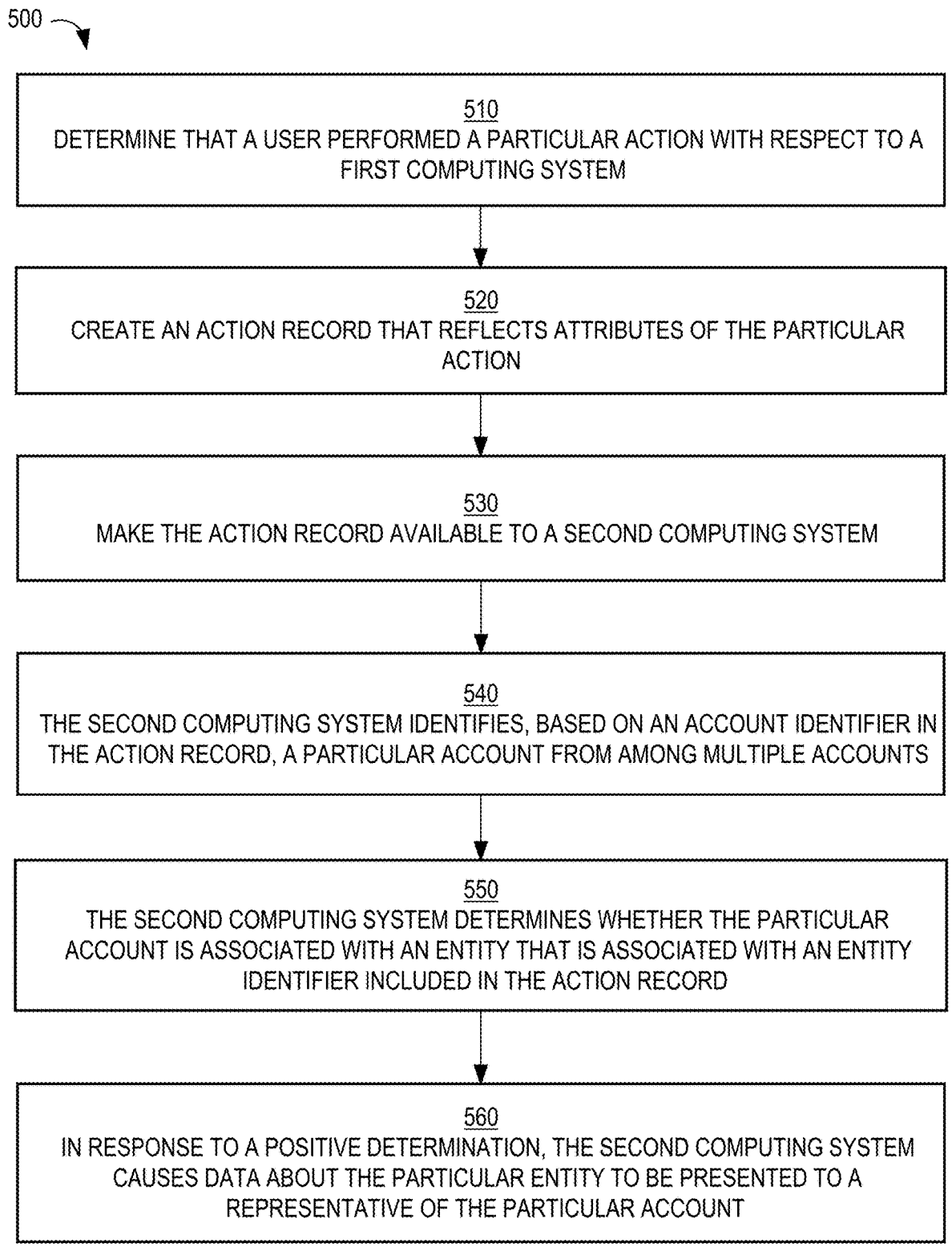
FIG. 5 is a flow diagram that depicts a process for leveraging entity-related actions with respect to one computer system in presenting relevant information to users of another computer system, in an embodiment.

FIG. 5 is a flow diagram that depicts a process 500 for leveraging entity-related actions with respect to one computer system in presenting relevant information to users of another computer system, in an embodiment. Process 500 may be performed by two or more computing systems, such as content delivery system 120, publisher system 130, and entity identification system 200.

At block 510, it is determined that a user performed a particular action with respect to a first computing system, such as content delivery system 120. For example, content delivery system 120 receives a content request (e.g., from publisher system 130 or from a client device) and, in response, conducts a content item selection event, which involves selecting a particular content delivery campaign and causing a content item from the campaign to be transmitted to the client device for display. The content item may be displayed concurrently with other content requested by the client device and delivered by publisher system 130. Example actions include a like, a share, a comment, or filling out a form with personal information. Block 510 may be performed by content delivery system 120 based on interaction data that is transmitted from the client device to content delivery system 120.

At block 520, an action record is created to reflect attributes of the particular action. Block 520 may be performed by content delivery system 120. The action record indicates an account associated with the content provider that initiated or created the campaign. The action record may also include an entity identifier that identifies (or is associated with) the user.

At block 530, the action record is made available to a second computing system (e.g., entity identification system 200) that is different than the first computer system.

At block 540, the second computing system identifies, based on an account indicator in the action record, a particular account from among multiple accounts, for which the second computing system stores and maintains account-specific information, such as access privileges, authorizations, and a history of usage of the second computing system by users associated with the account. The account-specific information may be maintained in an account database, such as account database 225, or in a transaction management system (e.g., transaction management system 240).

At block 550, the second computing system determines whether the particular account is associated with an entity that is associated with an entity identifier included in the action record. The particular account may include multiple entity records, each including one or more entity identifiers that may be used to look the entity record.

The particular action may be non-public action, in which case the entity that is being searched for is an organization (such as an employer of the user) and the entity identifier is an organization identifier.

At block 560, in response to determining that the particular account is associated with a particular entity that is associated with the entity identifier, the second computing system causes data about the particular entity to be presented to a user of the particular account (and of the second computing system), such as a sales representative. The presentation may happen much later than the determination. For example, a user of the second computing system might not log onto the second computing system until day or two after the particular entity is identified.

The data about the particular entity may be a ranked list of entities and the ranking of the particular entity is based on the action record. The ranking of the particular entity is higher than it otherwise would have been if the action record was not created.

A portion of process 500 (e.g., blocks 540-560) may be performed periodically (e.g., daily, hourly) such that the second computing system analyzes multiple action records in a batch process or groups the action records based on the account identifier. Additionally, to the extent that multiple action records are associated with a particular account, are based on non-public actions, and pertain to the same organization, the second computing system may aggregate the non-public actions of those action records to generate aggregate data, such as a number of clicks of a content item by employees of a particular organization, number of video views by employees of the particular organization, or number of website visits by employees of the particular organization.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
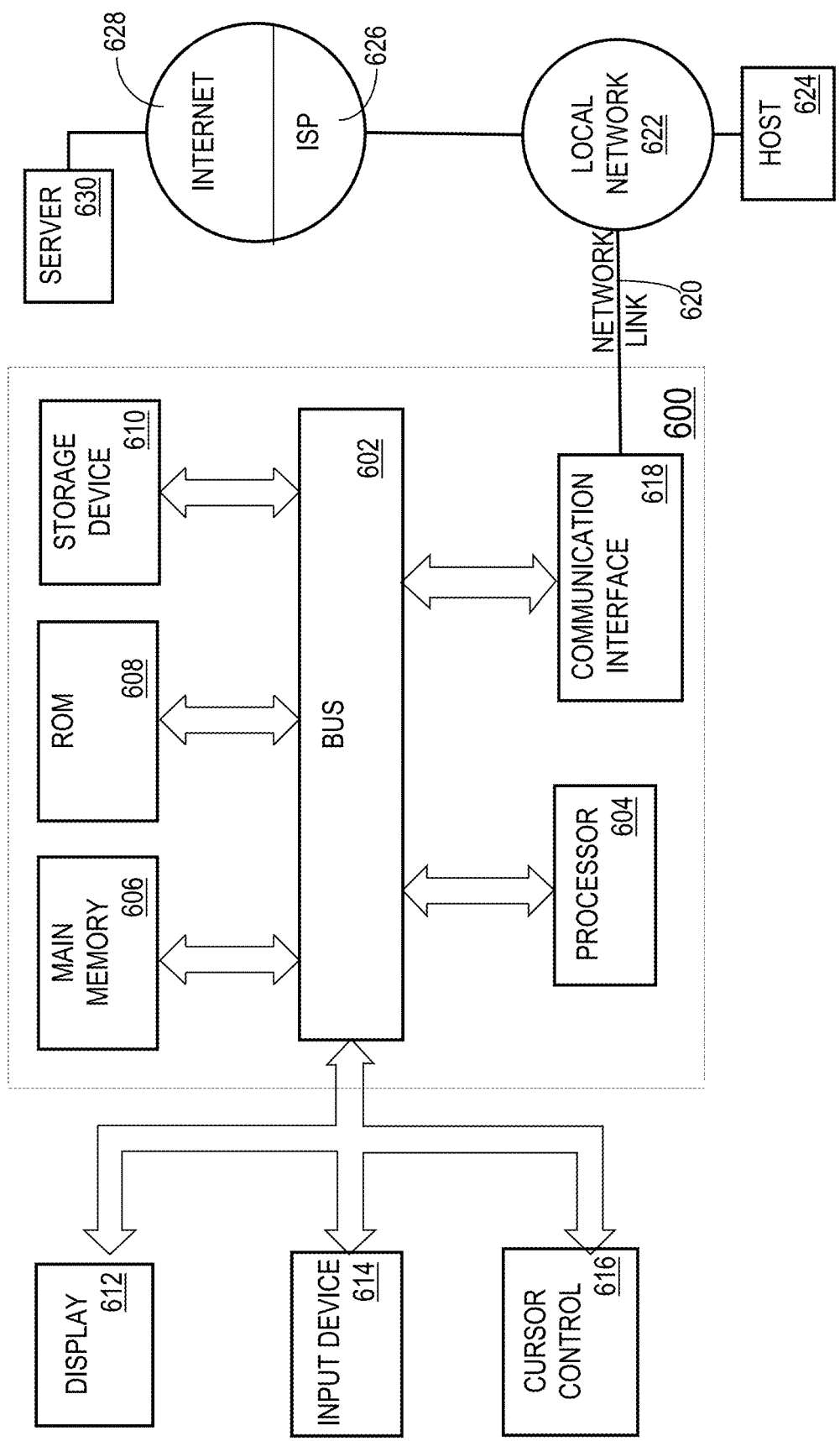
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   a content delivery system that comprises one or more first processors and one or more first storage media storing instructions which, when executed by the one or more first processors, cause:
      causing a content item that is associated with a content delivery campaign to be delivered over a computer network to a computing device of a first user;
      detecting that the first user performed an action relative to the content item;
      in response to detecting that the first user performed an action relative to the content item, creating an action record that indicates a particular entity associated with the first user and that indicates an account that is associated with the content item;
      causing the action record to be made available to an entity identification system;
   the entity identification system that comprises an account database, one or more second processors, and one or more second storage media storing instructions which, when executed by the one or more second processors, cause:
      based on the account indicated in the action record, identifying a particular account from among a plurality of accounts indicated in the account database;
      based on the particular entity indicated in the action record, searching the particular account for one or more entities that match the particular entity;
      determining that a first entity associated with the particular account matches the particular entity;
      in response to determining that the first entity associated with the particular account matches the particular entity, causing data about the first entity to be presented to a second user, of the entity identification system, that is associated with the particular account.

2. A method comprising:
   identifying a particular entity that has interacted with particular content that is presented through a first computer system;
   determining an account associated with the particular content;
   creating an action record that includes an account identifier that identifies the account and an entity identifier that is associated with the particular entity;
   causing the action record to be made available to a second computer system that is different than the first computer system;
   analyzing, by the second computer system, the action record, wherein analyzing comprises identifying the account identifier and the entity identifier;
   based on the account identifier, identifying a particular account from among a plurality of accounts indicated in an account database associated with the second computer system;
   based on the entity identifier, searching the particular account for an entity that is associated with the entity identifier;
   wherein searching the particular account comprises determining that a first entity associated with the particular account is associated with the entity identifier;
   in response to determining that the first entity associated with the particular account is associated with the entity identifier, causing data about the first entity to be presented to a user, of the second computer system, that is associated with the particular account.

3. The method of claim 2, wherein an interaction by the particular entity with the particular content comprises one of a like, a share, a comment, or filling out a form.

4. The method of claim 2, wherein an interaction by the particular entity with the particular content is a particular action of a plurality of actions, wherein each action of the plurality of actions dictates how the second computer system responds to said each action.

5. The method of claim 4, wherein a plurality of responses, performed by the second computer system, to the plurality of actions include two or more of: a first type of notification, a second type of notification that is different than the first type of notification, or ranking multiple data items, each corresponding to a different entity.

6. The method of claim 2, wherein an interaction by the particular entity with the particular content is classified as a particular type of action, the method further comprising:
- identifying a second entity that has interacted with second content that is presented through the first computer system;
- determining a second account associated with the second content;
- creating a second action record that includes a second account identifier that identifies the second account;
- causing the second action record to be made available to the second computer system;
- analyzing, by the second computer system, the second action record, wherein analyzing comprises identifying the second account identifier;
- based on the second account identifier, identifying a second particular account from among the plurality of accounts indicated in the account database associated with the second computer system;
- in response to identifying the second particular account and based on the interaction being classified as the particular type of action, causing second data about the second particular account to be presented to a second user, of the second computer system, that is associated with the second particular account.

7. The method of claim 6, further comprising:
- identifying a third entity that has interacted with the second content that is presented through the first computer system;
- determining the second account associated with the second content;
- creating a third action record that includes the second account identifier that identifies the second account;
- based on the second action record and the third action record being associated with the same account, aggregating actions indicated by the third action record and the second action record to generate aggregated action data;
- causing the aggregated action data to be presented to the second user, of the second computer system, that is associated with the second particular account.

8. The method of claim 2, wherein the account database is part of a transaction management system, the method further comprising:
- in response to determining that the first entity associated with the particular account is associated with the entity identifier, updating the particular account to indicate that the first entity performed a particular action with respect to the particular content.

9. The method of claim 2, further comprising, prior to identifying the particular entity:
- identifying a plurality of entities that have been identified, by a plurality of users, through one or more interfaces of the second computer system, wherein the plurality of entities includes the particular entity;
- for each entity in the plurality of entities, determining a stage, from among a plurality of stages, to which said each entity is associated;
- based on the stage associated with each entity in the plurality of entities, creating a plurality of entity groups, each entity group corresponding to a different stage of the plurality of stages;
- causing the plurality of entity groups to be presented through an interface of the first computer system;
- wherein identities of entities in the plurality of entity groups are not available to users of the first computer system.

10. The method of claim 2, further comprising, prior to identifying the particular entity:
- identifying a plurality of entities that have been identified, by a plurality of users, through one or more interfaces of the second computer system, wherein the plurality of entities includes the particular entity;
- activating, by the first computer system, a content delivery campaign that targets at least a subset of the plurality of entities;
- while the content delivery campaign is active and the subset of the plurality of entities is a target audience of the content delivery campaign:
  - identifying, by the second computer system, a second plurality of entities based on actions performed by a user of the second computer system;
  - in response to identifying the second plurality of entities, causing the target audience to be updated to include the second plurality of entities.

11. One or more storage media storing instructions which, when executed by one or more processors, cause:
- identifying a particular entity that has interacted with particular content that is presented through a first computer system;
- determining an account associated with the particular content;
- creating an action record that includes an account identifier that identifies the account and an entity identifier that is associated with the particular entity;
- causing the action record to be made available to a second computer system that is different than the first computer system;
- analyzing, by the second computer system, the action record, wherein analyzing comprises identifying the account identifier and the entity identifier;
- based on the account identifier, identifying a particular account from among a plurality of accounts indicated in an account database associated with the second computer system;
- based on the entity identifier, searching the particular account for an entity that is associated with the entity identifier;
- wherein searching the particular account comprises determining that a first entity associated with the particular account is associated with the entity identifier;
- in response to determining that the first entity associated with the particular account is associated with the entity identifier, causing data about the first entity to be presented to a user, of the second computer system, that is associated with the particular account.

12. The one or more storage media of claim 11, wherein an interaction by the particular entity with the particular content comprises one of a like, a share, a comment, or filling out a form.

13. The one or more storage media of claim 11, wherein an interaction by the particular entity with the particular content is a particular action of a plurality of actions, wherein each action of the plurality of actions dictates how the second computer system responds to said each action.

14. The one or more storage media of claim 13, wherein a plurality of responses, performed by the second computer system, to the plurality of actions include two or more of: a first type of notification, a second type of notification that is different than the first type of notification, or ranking multiple data items, each corresponding to a different entity.

15. The one or more storage media of claim 11, wherein an interaction by the particular entity with the particular content is classified as a particular type of action, wherein the instructions, when executed by the one or more processors, further cause:

identifying a second entity that has interacted with second content that is presented through the first computer system;

determining a second account associated with the second content;

creating a second action record that includes a second account identifier that identifies the second account;

causing the second action record to be made available to the second computer system;

analyzing, by the second computer system, the second action record, wherein analyzing comprises identifying the second account identifier;

based on the second account identifier, identifying a second particular account from among the plurality of accounts indicated in the account database associated with the second computer system;

in response to identifying the second particular account and based on the interaction being classified as the particular type of action, causing second data about the second particular account to be presented to a second user, of the second computer system, that is associated with the second particular account.

16. The one or more storage media of claim 15, wherein the instructions, when executed by the one or more processors, further cause:

identifying a third entity that has interacted with the second content that is presented through the first computer system;

determining the second account associated with the second content;

creating a third action record that includes the second account identifier that identifies the second account;

based on the second action record and the third action record being associated with the same account, aggregating actions indicated by the third action record and the second action record to generate aggregated action data;

causing the aggregated action data to be presented to the second user, of the second computer system, that is associated with the second particular account.

17. The one or more storage media of claim 11, wherein the account database is part of a transaction management system, wherein the instructions, when executed by the one or more processors, further cause:

in response to determining that the first entity associated with the particular account is associated with the entity identifier, updating the particular account to indicate that the first entity performed a particular action with respect to the particular content.

18. The one or more storage media of claim 11, wherein the instructions, when executed by the one or more processors, further cause, prior to identifying the particular entity:

identifying a plurality of entities that have been identified, by a plurality of users, through one or more interfaces of the second computer system, wherein the plurality of entities includes the particular entity;

for each entity in the plurality of entities, determining a stage, from among a plurality of stages, to which said each entity is associated;

based on the stage associated with each entity in the plurality of entities, creating a plurality of entity groups, each entity group corresponding to a different stage of the plurality of stages;

causing the plurality of entity groups to be presented through an interface of the first computer system;

wherein identities of entities in the plurality of entity groups are not available to users of the first computer system.

19. The one or more storage media of claim 11, wherein the instructions, when executed by the one or more processors, further cause, prior to identifying the particular entity:

identifying a plurality of entities that have been identified, by a plurality of users, through one or more interfaces of the second computer system, wherein the plurality of entities includes the particular entity;

activating, by the first computer system, a content delivery campaign that targets at least a subset of the plurality of entities;

while the content delivery campaign is active and the subset of the plurality of entities is a target audience of the content delivery campaign:

identifying, by the second computer system, a second plurality of entities based on actions performed by a user of the second computer system;

in response to identifying the second plurality of entities, causing the target audience to be updated to include the second plurality of entities.

\* \* \* \* \*